(12) United States Patent
Ohira

(10) Patent No.: US 12,094,233 B2
(45) Date of Patent: Sep. 17, 2024

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventor: Yoshie Ohira, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 508 days.

(21) Appl. No.: 17/326,654

(22) Filed: May 21, 2021

(65) Prior Publication Data

US 2022/0198190 A1   Jun. 23, 2022

(30) Foreign Application Priority Data

Dec. 18, 2020  (JP) .................................. 2020-210731

(51) Int. Cl.
| | | |
|---|---|---|
| *G06V 30/418* | (2022.01) | |
| *G06V 10/22* | (2022.01) | |
| *G06V 30/10* | (2022.01) | |
| *G06V 30/416* | (2022.01) | |

(52) U.S. Cl.
CPC ............ *G06V 30/418* (2022.01); *G06V 10/22* (2022.01); *G06V 30/416* (2022.01); *G06V 30/10* (2022.01)

(58) Field of Classification Search
CPC .... G06V 30/418; G06V 10/22; G06V 30/416; G06V 30/10; G06V 30/41; G06F 40/18; G06F 40/232
See application file for complete search history.

(56) References Cited

U.S. PATENT DOCUMENTS

| | | | | |
|---|---|---|---|---|
| 10,339,428 | B2* | 7/2019 | Hu ....................... | G06V 30/242 |
| 11,756,321 | B2* | 9/2023 | Tatsumi ................ | G06F 18/217 |
| | | | | 382/161 |
| 11,769,054 | B2* | 9/2023 | Wu ...................... | G06V 30/226 |
| | | | | 382/137 |
| 2005/0071637 | A1* | 3/2005 | Shirakawa .............. | G06F 21/36 |
| | | | | 713/170 |
| 2007/0098263 | A1* | 5/2007 | Furukawa ............ | G06V 30/387 |
| | | | | 715/201 |
| 2009/0125509 | A1* | 5/2009 | Takebe ............... | G06V 30/1456 |
| | | | | 707/999.005 |
| 2016/0171298 | A1* | 6/2016 | Takeda ................ | G06F 16/5846 |
| | | | | 382/176 |
| 2018/0032842 | A1* | 2/2018 | Yellapragada ............ | G06T 7/11 |
| 2019/0258854 | A1* | 8/2019 | Hosabettu ............ | G06V 30/414 |
| 2020/0175267 | A1* | 6/2020 | Schäfer ................ | G06V 30/413 |
| 2021/0012138 | A1* | 1/2021 | Kondoh ............... | G06V 30/268 |
| 2021/0201018 | A1* | 7/2021 | Patel ....................... | G06F 18/22 |
| 2021/0287029 | A1* | 9/2021 | Hashimoto ........... | G06F 40/106 |

(Continued)

FOREIGN PATENT DOCUMENTS

| | | | | |
|---|---|---|---|---|
| EP | 3779781 A1 * | 2/2021 | ......... | G06K 9/00449 |
| EP | 3779782 A1 * | 2/2021 | ......... | G06K 9/00442 |
| JP | 2005-018678 A | 1/2005 | | |

*Primary Examiner* — Mia M Thomas
(74) *Attorney, Agent, or Firm* — Oliff PLC

(57) ABSTRACT

An information processing apparatus includes a processor configured to control a display such that a result of recognition, which is obtained by recognizing an image on which a character string is written, and a result of comparison, which is obtained by comparing the result of recognition with a database registered in advance, are displayed next to each other.

13 Claims, 11 Drawing Sheets

(56) References Cited

U.S. PATENT DOCUMENTS

| | | | |
|---|---|---|---|
| 2023/0106967 A1* | 4/2023 | Aggarwal | G06V 30/416 |
| | | | 382/225 |
| 2023/0206672 A1* | 6/2023 | Miyauchi | G06V 30/412 |
| | | | 382/217 |
| 2023/0306193 A1* | 9/2023 | Ishizuka | G06V 30/10 |
| 2023/0306767 A1* | 9/2023 | Ban | G06V 10/80 |

* cited by examiner

FIG. 5A

| ITEM NAME | COMPANY NAME | RECOGNITION RESULT | JI XEROX |
| FRAME TYPE | ALL CHARACTERS ▼ | OCR RESULT | JI XEROX |

805 → CANDIDATE CORRECTION BASED ON COMPARISON  ○ YES  ● NO    803

| COMPARISON DATA | SELECT ▼ | CORRECTION RESULT | |

806 → DATA CONVERSION BASED ON COMPARISON  ○ YES  ● NO

| CONVERSION DATA | SELECT ▼ | CONVERSION RESULT | |

FIG. 5B

| ITEM NAME | COMPANY NAME | RECOGNITION RESULT | FUJI XEROX C |
| FRAME TYPE | ALL CHARACTERS ▼ | OCR RESULT | JI XEROX |

805 → CANDIDATE CORRECTION BASED ON COMPARISON  ● YES  ○ NO    803

| COMPARISON DATA | BUSINESS PARTNER LIST: COMPANY NAME ▼ | CORRECTION RESULT | FUJI XEROX Co |

806 → DATA CONVERSION BASED ON COMPARISON  ● YES  ○ NO

| CONVERSION DATA | BUSINESS PARTNER LIST: COMPANY CODE ▼ | CONVERSION RESULT | DB001 |

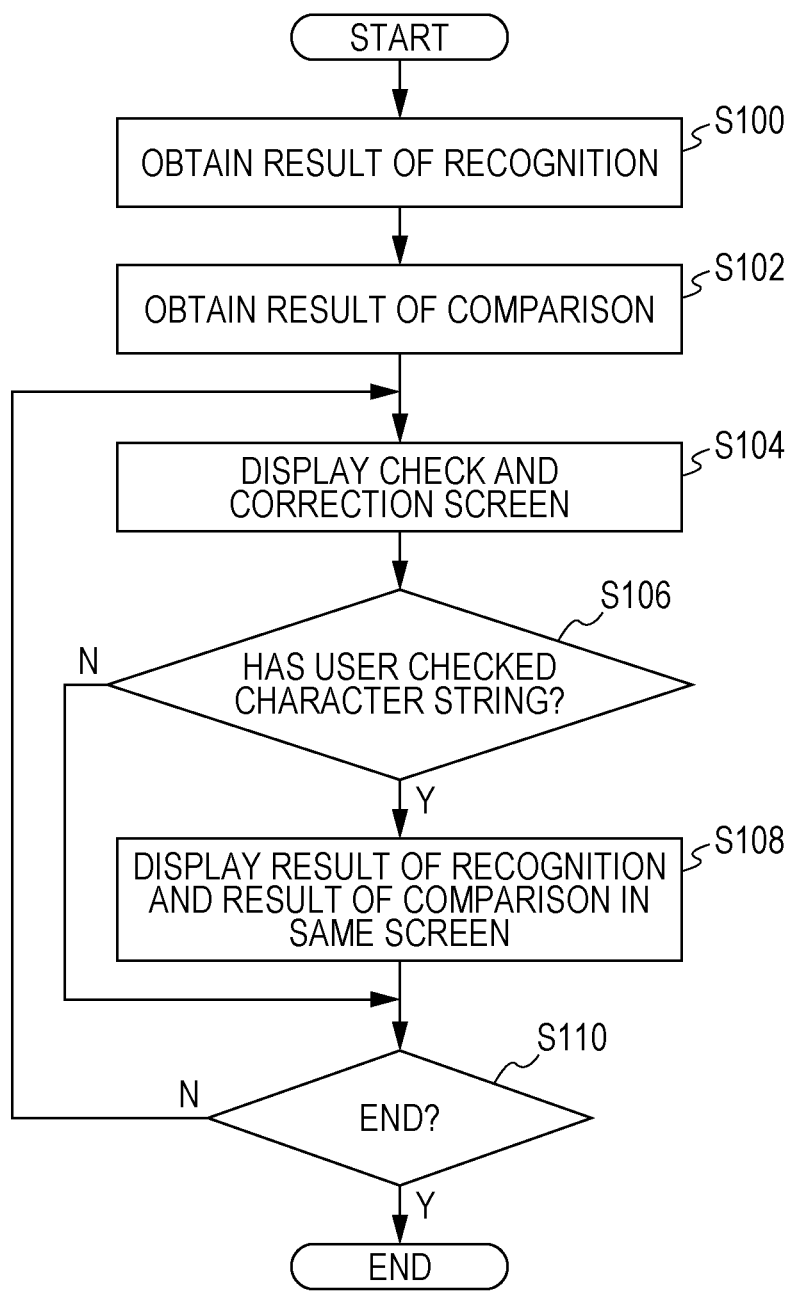

FIG. 7

EXTRACTION RESULT CHECK AND CORRECTION

FORM VIEW

RECEIPT-08142020:0005

801

800

PAGE 1/2   100%

CHARACTER SIZE  SMALL MEDIUM LARGE   CONFIDENCE CHECK ☐   ACTION ▸

810  SCAN IMAGE/RECOGNITION RESULT

ITEM NAME ▸

DELIVERY DATE   813 → 07/08/2020
812            814 → 07/08/2020
               811

REGISTRATION CONDITION   ☑   ☑ NEW

ADDRESS 815  (H)   (H)   (H)
816  ☐    ☐    ☐

PREVIOUS RECORD  SPECIFY RECORD ▸  NEXT RECORD

KEEP   CANCEL   3/50 ITEMS CHECKED   OK

EDIT APPLICATION FORM B250 — KEEP — ✕

⊘ CONFIGURATION → ⊘ DRAFT → ⊘ READING METHOD → ⊘ CHECK → CHECK OUTPUT → COMPLETE

CSV OUTPUT SETTINGS | IMAGE OUTPUT SETTINGS

FILE NAME: {JOB RULE NAME} _ {OUTPUT TIME} ⊕ .csv
CHARACTER CODE: ● UTF-8 (WITH BOM)  ○ UTF-8  ○ Shift-JIS
HEADER: ● YES  ○ NO

| COLUMN A | COLUMN B | COLUMN C | COLUMN D | COLUMN E |
|---|---|---|---|---|
| FINANCIAL INSTITUTION NAME | BRANCH NAME | NOTIFICATION TYPE | NAME | NOTIFICATION DATE |
| YOKOHAMA | YOKOHAMA | START | TARO YAMADA | AUG. 10, 2020 |
| KAWASHIN | KAWASAKI | STOP | TARO FUJI | AUG. 11, 2020 |
| ASHIKAGA | ASHIKAGA | START | TARO XERO | AUG. 12, 2020 |

⊕

DOWNLOAD

BACK  NEXT

FIG. 14

EDIT APPLICATION FORM B250

CONFIGURATION → DRAFT → READING METHOD → CHECK → CHECK OUTPUT → COMPLETE

KEEP

CSV OUTPUT SETTINGS – COLUMN A

TYPE: OCR CHECK AND CORRECTION RESULT
READING ITEM: FINANCIAL INSTITUTION NAME – [TEXT RECOGNITION FRAME]
CONVERSION PROCESS 1: NONE

DELETE  OK  CANCEL

NEXT  BACK

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-210731 filed Dec. 18, 2020.

BACKGROUND

(i) Technical Field

The present disclosure relates to an information processing apparatus and a non-transitory computer readable medium.

(ii) Related Art

Information processing apparatuses that perform information processing for recognizing characters on images obtained by optically reading forms are known. In Japanese Unexamined Patent Application Publication No. 2005-18678, for example, a form data input device is disclosed that includes reading means for generating an image by optically reading a form to be read, field detection means for detecting fields of the image on the basis of form definition information regarding forms stored in advance, character recognition means for recognizing an image of characters included in each of the fields detected by the detection means and, if the image of characters is recognized, giving a corresponding character code, comparison means for comparing, for each of the fields in which the character recognition means has recognized all characters, a character string consisting of the recognized characters with character strings used on the form and, if a result of the comparison is a character string that is not used on the form, outputting recognition state information indicating that the field is a misread field, and display means for, when displaying character fonts corresponding to character codes given by the character recognition means in contrast to images of the fields, displaying misread fields and correctly read fields in a distinguishable manner on the basis of the recognition state information output from the comparison means.

SUMMARY

When a character string handwritten by a user is recognized through optical character recognition (OCR), for example, a result of the recognition might not necessarily be a character string intended by the user. When the user writes one of character strings defined by a system, for example, a character string intended by the user is one of the character strings defined by the system. A character string written by the user, therefore, is recognized through OCR, and a character string corresponding to a result of the recognition is identified using a database in which the character strings defined by the system are registered in advance and then displayed. It is difficult, however, for the user to tell whether displayed candidates for a character string are results of character recognition or results of comparison of the results of character recognition.

Aspects of non-limiting embodiments of the present disclosure relate to an information processing apparatus and a non-transitory computer readable medium that enable the user to distinguish between a result of recognition of an image on which a character string is written and a result of comparison of the result of recognition.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to control a display such that a result of recognition, which is obtained by recognizing an image on which a character string is written, and a result of comparison, which is obtained by comparing the result of recognition with a database registered in advance, are displayed next to each other.

BRIEF DESCRIPTION OF THE DRAWINGS

An exemplary embodiment of the present disclosure will be described in detail based on the following figures, wherein:

FIGS. 5A and 5B are diagrams illustrating an example of an image of a setting area included in the setting screen for making the reading definition settings: FIG. 5A illustrates the image before setting, and FIG. 5B illustrates the image after the setting;

FIG. 6 is a flowchart illustrating an example of a process for processing information achieved by an information processing program according to the exemplary embodiment;

FIG. 7 is a diagram illustrating an example of a check and correction screen according to the exemplary embodiment;

FIG. 13 is a diagram illustrating an example of a setting screen relating to data conversion; and FIG. 14 is a diagram illustrating another example of the setting screen relating to the data conversion.

DETAILED DESCRIPTION

Figure 1:
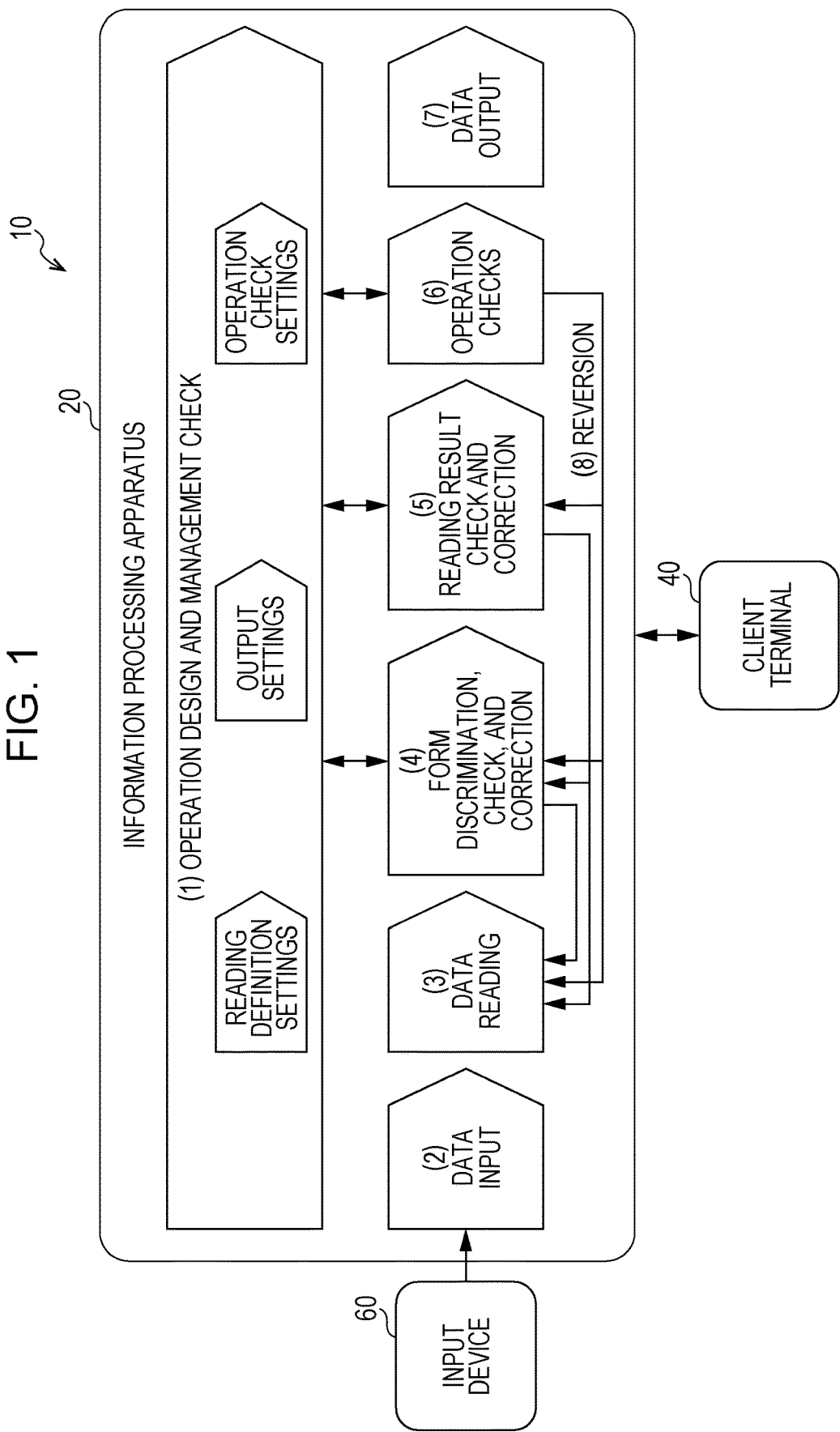
FIG. 1 is a diagram illustrating the schematic configuration of a form system according to an exemplary embodiment.

An exemplary embodiment for implementing a technique in the present disclosure will be described in detail hereinafter with reference to the drawings. Components and steps that achieve the same operations, effects, or functions are given the same reference numerals throughout the drawings, and redundant description thereof might be omitted as necessary. The drawings are only specific enough to facilitate understanding of the technique in the present disclosure. The technique in the present disclosure, therefore, is not limited to examples illustrated in the drawings. In the exemplary embodiment, description of known components and components that are not directly related to the present disclosure might be omitted.

First Exemplary Embodiment

FIG. 1 is a diagram illustrating the schematic configuration of a form system 10 according to a first exemplary embodiment.

As illustrated in FIG. 1, the form system 10 includes an information processing apparatus 20, a client terminal 40, and an input device 60. These apparatuses are connected to a network, which is not illustrated, and communicate with one another over the network. The network is, for example, the Internet, a local area network (LAN), or a wide-area network (WAN).

The information processing apparatus 20 manages processing where OCR is performed on image data regarding documents including a form input through an input device 60 and a result of the OCR is output to a predetermined destination. A specific configuration of, and an effect produced by, the information processing apparatus 20 will be described later.

The client terminal 40 transmits various instructions relating to OCR to the information processing apparatus 20. The various instructions include, for example, an instruction to start to read image data and an instruction to display a result of the reading of the image data. The client terminal 40 also displays, in accordance with various instructions that have been received, various pieces of information such as a result of OCR performed by the information processing apparatus 20 and a notification about the OCR. The client terminal 40 is, for example, a server computer or a general-purpose computer such as a personal computer (PC). Although FIG. 1 illustrates only one client terminal 40, plural client terminals 40 may be prepared, instead, and used for different processes.

The input device 60 inputs image data to be subjected to OCR to the information processing apparatus 20. The input device 60 is, for example, a server computer, a general-purpose computer such as a PC, or an image forming apparatus having a scanning function, a printing function, and a facsimile function. In addition to the input device 60, the client terminal 40 may also be able to input image data to the information processing apparatus 20.

Next, an outline of the form system 10 will be described.

In the form system 10, the information processing apparatus 20 performs OCR on image data input through the input device 60 and outputs a result of the OCR to a predetermined destination.

In the OCR, the information processing apparatus 20 manages various processes including (1) operation design and management check, (2) data input, (3) data reading, (4) form discrimination, check, and correction, (5) reading result check and correction, (6) operation checks, (7) data output, and (8) reversion. In the present exemplary embodiment, the OCR includes not only a process for reading characters, symbols, and the like from image data but also post-processing such as correction of the characters.

In an example of the management of the various processes, the information processing apparatus 20 automatically performs (1) operation design and management check, (2) data input, (3) data reading, (6) operation checks, and (7) data output. As for (4) form discrimination, check, and correction and (5) reading result check and correction, a user makes inputs using the client terminal 40. The information processing apparatus 20 may automatically perform (8) reversion, or the user may make an input for (8) reversion using the client terminal 40.

In (1) operation design and management check, job rules including reading definition settings, output settings, and operation check settings are created. In the reading definition settings, for example, reading areas, in which image data is to be read in (3) data reading, are set. More specifically, for example, a definition is set such that item values, which are values to be read, will be read from rightward areas of items to be extracted as keys. In the output settings, for example, a file format of data output in (7) data output and a destination are set. In the operation check settings, for example, a format including required input items and the number of characters that can be input on a form to be detected in (6) operation checks is set.

In (2) data input, image data is input from the input device 60. The input image data is registered as a job, which is a unit for which (3) data reading is to be performed.

In (3) data reading, the image data in the job is read using some of the job rules created in (1) operation design and management check and selected by the user for the job. In this process, for example, discrimination of a form included in the image data in the job (hereinafter referred to as "form discrimination") and reading of characters and symbols in the reading areas are performed.

In (4) form discrimination, check, and correction, the image data in the job is divided into records indicating the form included in the job on the basis of a result of the form discrimination performed in (3) data reading. The records are then displayed in this process, and the user checks and corrects the result of the form discrimination.

In (5) reading result check and correction, a result of the reading of characters and symbols in the reading areas performed in (3) data reading is displayed, and the user checks and corrects the result of the reading.

In (6) operation checks, an error in each of the preceding processes is detected on the basis of the operation check settings included in some of the job rules selected by the user for the job, the job rules having been created in (1) operation design and management check. A result of the detection may be presented to the user.

In (7) data output, output data is created and output to a predetermined destination using the output settings included in some of the job rules selected by the user for the job, the job rules having been created in (1) operation design and management check.

In (8) reversion, a process performed in the OCR is reverted to another process one or more steps before. For example, the user requests reversion using the client terminal 40 during (4) form discrimination, check, and correction, (5) reading result check and correction, or the like. Alternatively, for example, a manager requests reversion using his/her client terminal 40 in accordance with a result of a check conducted by the manager between (6) operation checks and (7) data output.

In the OCR, (1) operation design and management check is performed before (3) data reading and the later processes are performed, that is, before the form system 10 is operated. Alternatively, (1) operation design and management check may be performed while (3) data reading and the later processes are being performed, that is, while the form system 10 is being operated. For example, the job rules created in (1) operation design and management check before the form system 10 is operated may be corrected in accordance with a result of (5) reading result check and correction, which is performed while the form system 10 is being operated.

Information Processing Apparatus

Figure 2:
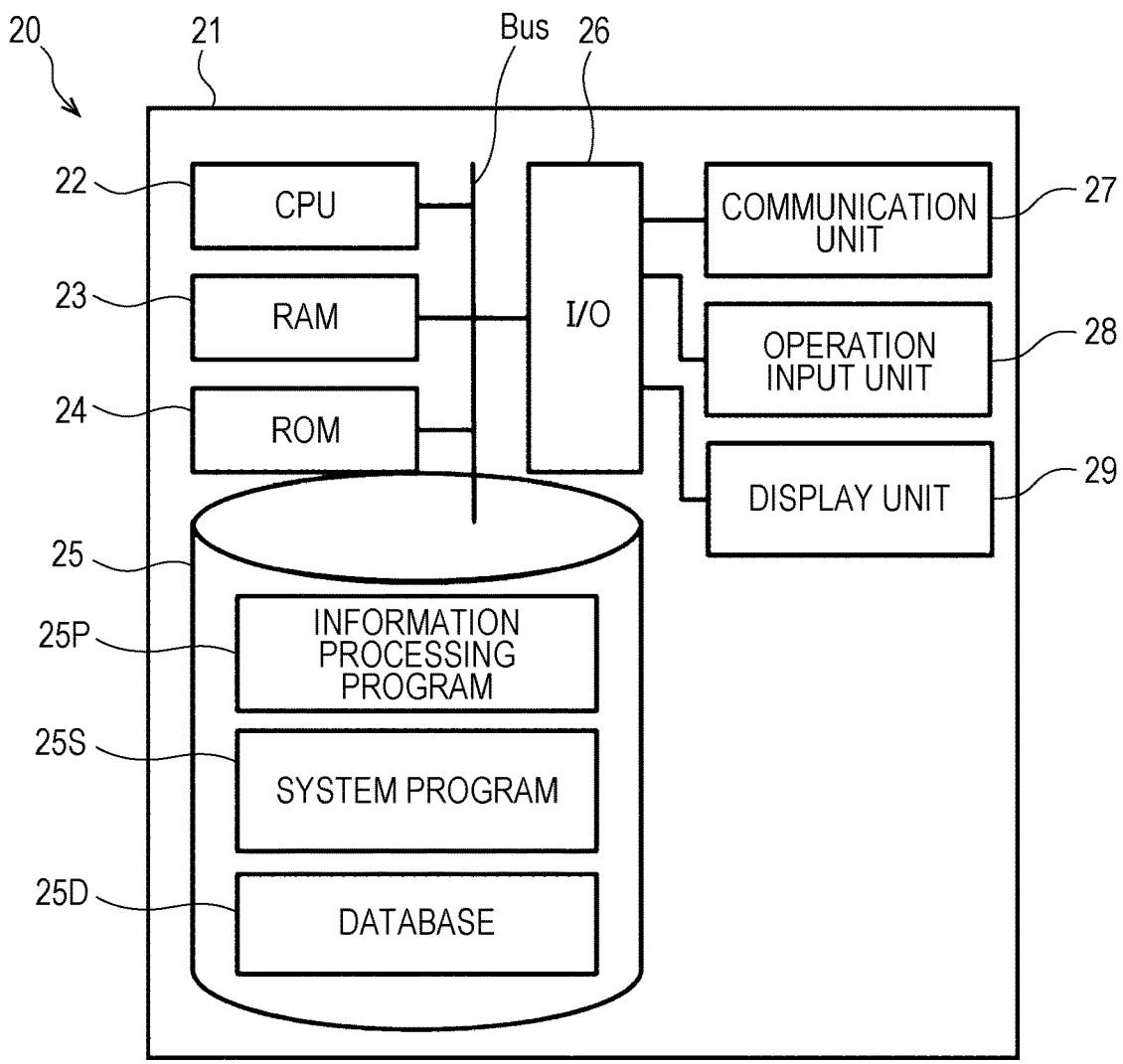
FIG. 2 is a diagram illustrating an example of the schematic electrical configuration of an information processing apparatus according to the exemplary embodiment.

Next, an example of the configuration of the information processing apparatus 20 will be described with reference to FIG. 2. FIG. 2 is a diagram illustrating an example of the schematic electrical configuration of the information processing apparatus 20 according to the present exemplary embodiment. The information processing apparatus 20 is, for example, a server computer or a general-purpose computer such as a PC.

More specifically, as illustrated in FIG. 2, the information processing apparatus 20 includes a computer 21. The computer 21 includes a central processing unit (CPU) 22, a random-access memory (RAM) 23, a read-only memory (ROM) 24, a storage unit 25, and an input/output port (I/O) 26. The CPU 22, the RAM 23, the ROM 24, the storage unit 25, and the I/O 26 are connected to one another by a bus Bus.

Functional units such as a communication unit 27 for achieving communication with external apparatuses, an operation input unit 28 that enables the user to input operations, and a display unit 29 that displays images are connected to the I/O 26. These functional units can communicate with the CPU 22 through the I/O 26.

The computer 21 may be achieved as a sub-control unit that controls a part of the information processing apparatus 20 or may be achieved as a control unit that controls the entirety of the information processing apparatus 20. An integrated circuit (IC) such as a large-scale integration (LSI) circuit or an IC chipset, for example, is used for a part or the entirety of each of blocks of the computer 21. Independent circuits may be used for different blocks, or a circuit on which some or all of the blocks are integrated may be used. The blocks may be integrated with one another, or some blocks may be separately provided. In each of the blocks, a part of the block may be separately provided. The computer 21 need not be integrated using an LSI circuit, and a dedicated circuit or a general-purpose processor may be used, instead.

The storage unit 25 stores an information processing program 25P for causing the information processing apparatus 20 to function as an information processing apparatus in the present disclosure. The CPU 22 reads the information processing program 25P from the storage unit 25 and loads the information processing program 25P into the RAM 23 to perform a process. By executing the information processing program 25P, the information processing apparatus 20 operates as the information processing apparatus in the present disclosure. The information processing program 25P may be provided in a storage medium such as a compact disc read-only memory (CD-ROM). A specific process performed by the information processing apparatus 20 will be described later.

An auxiliary storage device such as a hard disk drive (HDD), a solid-state drive (SSD), or a flash memory, for example, is used as the storage unit 25.

The information processing program 25P may be stored in the ROM 24, instead. Alternatively, for example, the information processing program 25P may be installed on the information processing apparatus 20 in advance. Alternatively, the information processing program 25P may be achieved by installing, on the information processing apparatus 20, program information stored in a nonvolatile storage medium and distributed over the network, which is not illustrated. Examples of the nonvolatile storage medium include a CD-ROM, a magneto-optical (MO) disk, an HDD, a digital versatile disc read-only memory (DVD-ROM), a flash memory, and a memory card.

The storage unit 25 also stores a system program 25S for the information processing apparatus 20 to achieve functions in OCR. The CPU 22 reads the system program 25S from the storage unit 25 and loads the system program 25S into the RAM 23 to perform OCR. By executing the system program 25S, the information processing apparatus 20 becomes able to achieve system functions in OCR.

Although the information processing program 25P and the system program 25S are separate programs in the present exemplary embodiment, the information processing program 25P may be executed as one of processes included in the system program 25S, instead.

The storage unit 25 also stores a database 25D in which data available to the information processing apparatus 20 is accumulated. The database 25D functions as an example of an accumulation unit in which predetermined character strings (e.g., items and item values) used in an external system are registered. The database 25D need not necessarily be stored in the storage unit 25. For example, the database 25D may be stored in an external apparatus that is not illustrated, and the database 25D in the external apparatus may be referred or written to over a communication link.

The communication unit 27 is connected to a communication network and achieves communication between the information processing apparatus 20 and external apparatuses. The communication network is a concept including a network for achieving data communication between devices through a wired and/or wireless communication link. For example, the communication network may be a narrow area communication network (e.g., a LAN) that achieves data communication at a corporate base or a wide area communication network (e.g., a wide area network (WAN)), such as the Internet, that achieves data communication through a public communication link.

Devices for inputting operations, such as a keyboard and a mouse, are provided as the operation input unit.

A liquid crystal display (LCD) or an organic electroluminescent (EL) display, for example, is used as the display unit 29. A touch panel having a function of the operation input unit may be used as the display unit 29, instead. The operation input unit and the display unit 29 receive various instructions from the user of the information processing apparatus 20. The display unit 29 displays results of processes performed in accordance with instructions received from the user and various pieces of information such as notifications about the processes.

Figure 3:
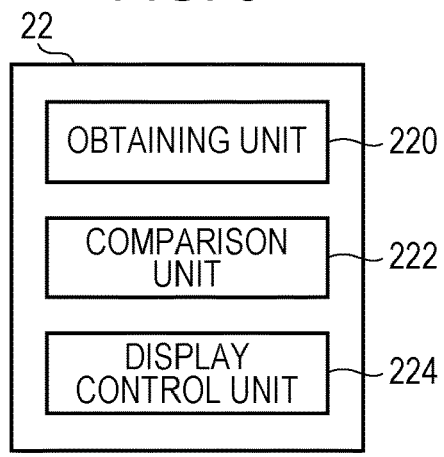
FIG. 3 is a diagram illustrating an example of the functional configuration of the information processing apparatus according to the exemplary embodiment.

FIG. 3 is a block diagram illustrating an example of the functional configuration of the information processing apparatus 20 according to the present exemplary embodiment.

As illustrated in FIG. 3, the CPU 22 of the information processing apparatus 20 according to the present exemplary embodiment functions as the information processing apparatus in the present disclosure by executing the information processing program 25P. The information processing apparatus in the present disclosure includes functional units that function as an obtaining unit 220, a comparison unit 222, and a display control unit 224, respectively.

The obtaining unit 220 is a functional unit that obtains information indicating a result of recognition of an image on which a character string is written. An example of the information indicating a result of recognition is information indicating a result of character recognition of an image of a form on which a character string is written.

The comparison unit 222 is a functional unit that compares a result of recognition obtained by the obtaining unit 220, that is, information indicating a result of recognition, with information indicating character strings registered in the database 25D in advance. The comparison unit 222 has a function of extracting, from the database 25D, one or more pieces of information (e.g., character string information) corresponding to information indicating a result of recognition. The function of extracting one or more pieces of information (e.g., character string information) from the database 25D is achieved by a known extraction process for extracting information that matches information indicating a result of recognition. The known extraction process may be a process for determining similarity between character strings or a process for determining a semantic distance between character strings. Details of a process for achieving the function of extracting one or more pieces of information from the database 25D will be described later.

The display control unit 224 is a functional unit that displays, next to each other, information indicating a result of recognition obtained by the obtaining unit 220 and information indicating a result of comparison obtained by the comparison unit 222 in at least a part of the display unit 29.

Next, the effect produced by the information processing apparatus 20 according to the present exemplary embodiment will be described.

In the present exemplary embodiment, the reading result check and correction ((5) in FIG. 1) in the OCR performed by the information processing apparatus 20 on image data regarding documents including a form input through the input device 60 will be described. That is, a process for displaying a result of reading of characters and symbols in the reading areas, which is performed in the data reading, to allow the user to check and correct the result of the reading will be described.

When the user writes down, in a form, one of character strings defined by an external system, for example, the handwritten character string is assumed to be one of the character strings defined by the external system. A character string corresponding to a result of character recognition of the character string written by the user, therefore, is identified using a database in which predetermined character strings have been registered by the external system and displayed. The result of the character recognition, however, is not necessarily a character string intended by the user. It is therefore difficult for the user to determine whether a candidate for a character string displayed as a result of reading is a result of character recognition or a result of comparison based on a character string obtained as a result of the character recognition.

In the present exemplary embodiment, therefore, the display unit 29 is controlled in such a way as to display, next to each other, a result of recognition of an image on which a character string is written and a result of comparison between the result of the recognition and a database registered in advance.

"Display a result of recognition and a result of comparison next to each other" herein refers to a concept of a display process where an image indicating a result of the recognition and an image indicating a result of comparison are displayed in the same screen without overlapping each other. For example, an image indicating a result of recognition and an image indicating a result of comparison are displayed in at least a part of the display unit 29 so that both images can be presented to the user.

A "result of reading" refers to a concept including a result of character recognition (e.g., a character string) and a result of comparison (e.g., a character string) employing a database in which character strings have been registered in advance. A result of comparison includes a character string displayed by comparing a character string that is a result of character recognition using a database in which predetermined character strings have been registered by an external system and identifying a character string corresponding to the character string that is the result of the character recognition as a result of comparison.

It is assumed in the present exemplary embodiment that the user makes the reading definition settings in job rules in advance. The reading definition settings will be described with reference to FIGS. 4 to 5B.

Figure 4:
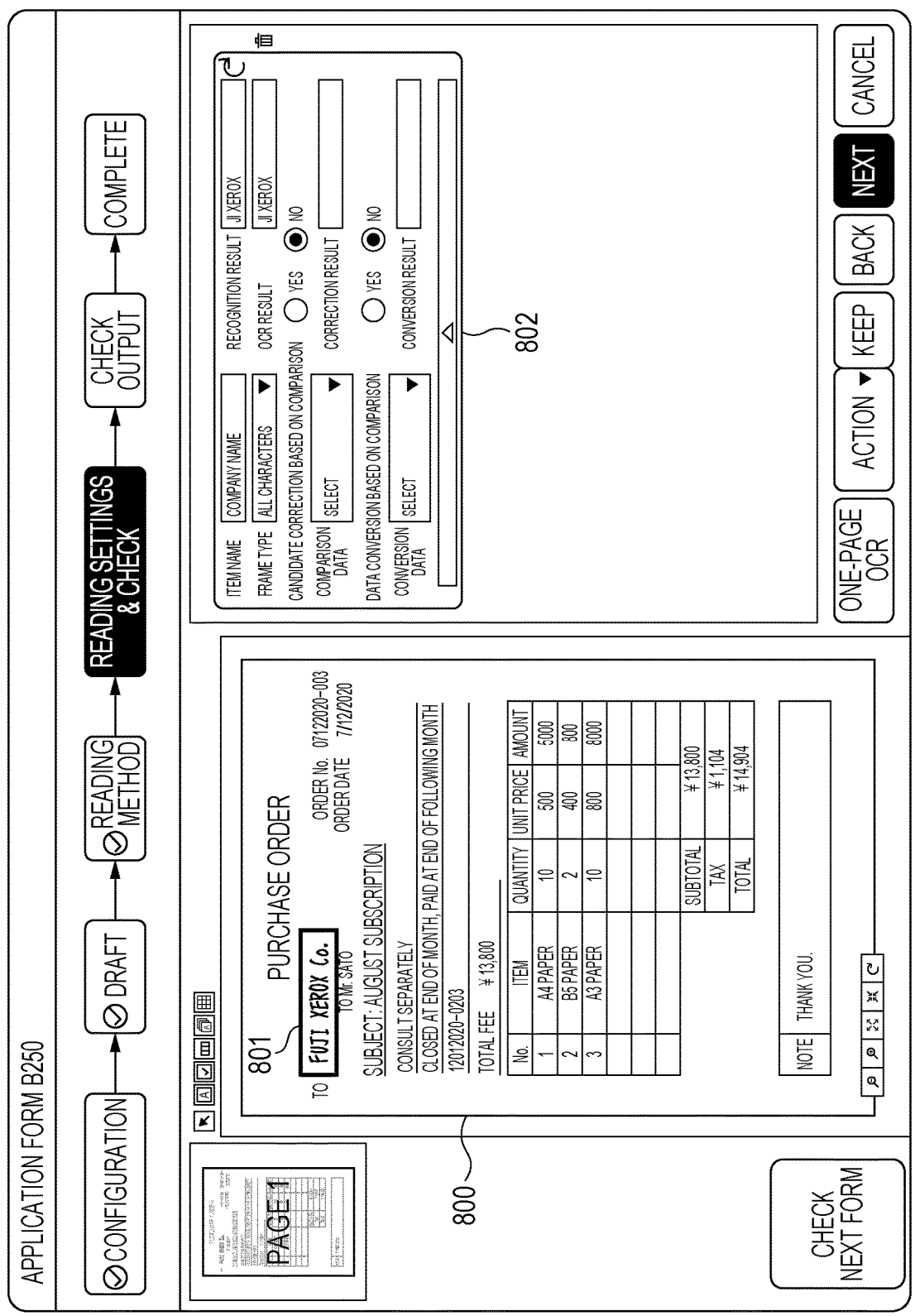
FIG. 4 is a diagram illustrating an example of a setting screen for making reading definition settings.

FIGS. 4 to 5B illustrate an example of a setting screen. FIG. 4 is a diagram illustrating an example of a setting screen for the user to make the reading definition settings. FIGS. 5A and 5B are diagrams illustrating an example of an image of a setting area included in the setting screen for making the reading definition settings. FIG. 5A illustrates the image before setting, and FIG. 5B illustrates the image after the setting.

As illustrated in FIG. 4, a setting screen 80 includes an image obtained as a result of scanning (hereinafter referred to as a "scan image") including an image to be subjected to OCR (hereinafter referred to as a "target image"), that is a scan image 800 of a form, for example, and an image (hereinafter referred to as a "setting image") 802 of a setting area set by the user. In the scan image 800 of the setting screen 80, an area image 801, which indicates an area of the image to be subjected to OCR, is also displayed.

As illustrated in FIG. 5A, the setting image 802 includes display areas 803 and 804. In the display area 803, a result of character recognition of the image to be subjected to OCR, which is indicated by the area image 801, is displayed. In FIGS. 5A and 5B, the display area 803 corresponds to an item "OCR result". In the display area 804, a result according to a setting as to whether to perform candidate correction is displayed. In FIGS. 5A and 5B, the display area 804 corresponds to an item "recognition result" and indicates a result of comparison.

The setting image 802 also includes a setting area 805 for candidate correction based on comparison and a setting area 806 for data conversion based on comparison.

The setting area 805 for the candidate correction based on comparison includes radio buttons, a display area for comparison data, and a display area for a correction result. The candidate correction based on comparison refers to a correction process in which character string information corresponding to a result of recognition of a target image is extracted from the database 25D and displayed. The radio buttons in the setting area 805 are used to determine whether to perform the candidate correction based on comparison (in FIGS. 5A and 5B, either "Yes" or "No" can be selected).

The display area for comparison data is activated if the radio button "Yes" is selected, and a type and a category of data included in the database 25D, for example, can be set. An item of data may also be set for the comparison data as well as the type and category of data. The display area for a correction result is activated if the radio button "Yes" is selected, and indicates a result of the candidate correction based on comparison.

If it is determined using the radio button that the candidate correction based on comparison is to be performed, the comparison data can be set as illustrated in FIG. 5B (FIG. 5B illustrates a case where "Business partner list: Company name" is set). The display area for a correction result indicates a result of the candidate correction based on comparison (FIG. 5B illustrates a case where "Fuji Xerox Co." is displayed).

The candidate correction based on comparison may be performed when the radio button "Yes" is set in the setting area 805 for the candidate correction based on comparison or when an instruction is given after the radio button "Yes" is set. In the present exemplary embodiment, the candidate correction based on comparison is performed when a reload button 807 is pressed.

The setting area 806 for the data conversion based on comparison includes radio buttons, a display area for conversion data, and a display area for a conversion result. The data conversion based on comparison refers to a conversion process where identification information, such as a code, corresponding to character string information on which the candidate correction based on comparison has been performed is identified in the database 25D and displayed. The radio buttons in the setting area 806 are used to determine whether to perform the data conversion based on comparison (In FIGS. 5A and 5B, either "Yes" or "No" can be selected).

The display area for conversion data is activated if the radio button "Yes" is set, and a type and a category of data included in the database 25D, for example, can be set. The display area for a conversion result is also activated if the radio button "Yes" is set, and indicates a result of the data conversion based on comparison.

If it is determined using the radio button that the data conversion based on comparison is to be performed, the conversion data can be set as illustrated in FIG. 5B (FIG. 5B illustrates a case where "Business partner list—Company code" is set). The display area for a conversion result indicates a result of the data conversion based on comparison (FIG. 5B illustrates a case where a code "DB001" corresponding to "Fuji Xerox Co." is displayed).

The data conversion based on comparison may be performed when the radio button "Yes" is set in the setting area 806 for the data conversion based on comparison, or when an instruction is given after the radio button "Yes" is set. In the present exemplary embodiment, the data conversion based on comparison is performed when the reload button 807 is pressed.

Next, information processing performed in accordance with the reading definition settings made by the user as job rules will be described in detail.

FIG. 6 is a flowchart illustrating an example of a process for processing information achieved by the information processing program 25P according to the present exemplary embodiment.

First, the user instructs the information processing apparatus 20 to activate the information processing program 25P, and the CPU 22 performs the following steps.

In step S100, the CPU 22 obtains information indicating a result of recognition of a scan image of a form in which a character string is written. The information indicating a result of recognition can be obtained from a result of the data reading ((3) in FIG. 1) in the OCR performed by the information processing apparatus 20 using the system program 25S. The process for obtaining information indicating a result of recognition is an example of a function of the obtaining unit 220 illustrated in FIG. 3.

In step S102, the CPU 22 compares the information indicating the result of recognition obtained in step S100 with information indicating character strings registered in the database 25D and obtains information indicating a result of the comparison. The process for obtaining information indicating a result of comparison is an example of a function of the comparison unit 222 illustrated in FIG. 3.

More specifically, in step S102, first, an extraction process where one or more pieces of information (e.g., character string information) corresponding to the information indicating the result of the recognition are extracted from the database 25D is performed. The extraction process is a process for extracting information that matches information indicating a result of recognition. In the extraction process, degrees of matching between a character string that is the information indicating the result of the recognition and the character strings registered in the database 25D are obtained, and information indicating registered character strings with which the degrees of matching exceed a predetermined value is extracted from the database 25D. In an example of the extraction process, degrees of similarity between character strings are obtained using a known process and whether the obtained degrees of similarity exceed a predetermined threshold is determined. Alternatively, semantic distances between character strings are obtained using a known process, and whether the obtained semantic distances exceed a predetermined threshold is determined.

In step S104, a check and correction screen for enabling the user to check information indicating the obtained result of the recognition and information indicating the result of the comparison. If information indicating plural results of comparison is extracted in step S102, information having a degree of matching higher than any other information, that is, information of a highest degree of matching, is identified as the information indicating the result of comparison and displayed.

FIG. 7 is a diagram illustrating an example of the check and correction screen according to the present exemplary embodiment. FIG. 7 illustrates an example where a form view, which is a screen including the scan image 800 of the form, is presented as a check and correction screen 81.

The check and correction screen 81 includes the scan image 800 of the form and an image of a check and correction area (hereinafter referred to as a "check and correction image 810") that enables the user to check a result of recognition and a result of comparison and correct the result of comparison. The area image 801 indicating a reading area, which is an area of an image to be subjected to OCR, is also displayed in the check and correction screen 81 for the scan image 800.

The check and correction image 810 includes a display area 811 for each of items determined as reading areas in advance. In the example illustrated in FIG. 7, the check and correction image 810 includes a display area 811 for each of items having item names of, for example, delivery date, registration information, and address. In each of the display areas 811, images of an item name, a scan image, a result of recognition, confidence, and a check are displayed. The display area 811 for the item name "delivery date" includes, for example, an image 812 indicating the item name, a scan image 813, an image 814 indicating a result of recognition, an image 815 indicating confidence, and an image 816 for allowing the user to indicate that the item has been checked.

In the check and correction image 810 illustrated in FIG. 7, a result of comparison based on a result of recognition is displayed as the image 814 indicating a "recognition result". A character string displayed as the image 814 is displayed such that the user can correct the character string. The image 815 indicating a degree of confidence is an image indicating the above-mentioned degree of matching and, more specifically, an image indicating an index of the degree of matching of information (character string) registered in the database 25D for information (character string) indicating the result of recognition. In FIG. 7, an image of "H", which indicates a high degree of matching, that is, for example, indicating that the degree of matching exceeds a threshold, is displayed. The image 816 is a checkbox for allowing the user to indicate that the item has been checked. The user can check the checkbox by clicking the image 816 after checking the item.

When the user requests data conversion based on comparison as described above, a display area for conversion data is activated, and a result of the data conversion based on comparison is displayed.

Figure 8:
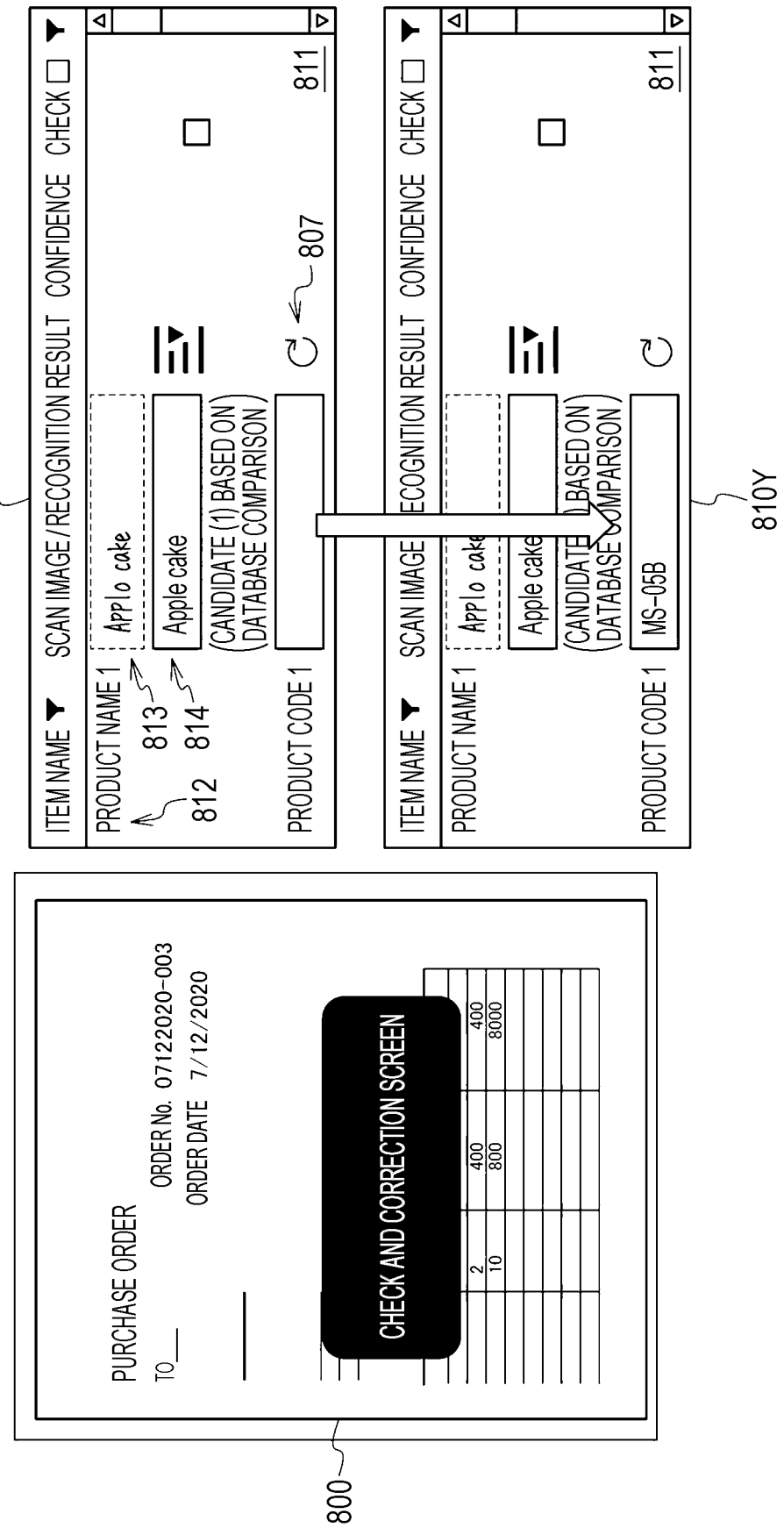
FIG. 8 is a diagram illustrating another example of the check and correction screen.

FIG. 8 is a diagram illustrating an example of a check and correction screen at a time when the user requests data conversion based on comparison.

As illustrated in FIG. 8, when the user requests data conversion based on comparison, a transition from a check and correction image 810X, in which information is not displayed in a display area for a result of conversion, to a check and correction image 810Y, in which a result of the data conversion based on comparison is displayed, is indicated. More specifically, a code "MS-05B" corresponding to "apple cake" is displayed in the display area for a result of conversion in the check and correction image 810Y.

As described above, when the user checks the check and correction image 810, it is difficult to tell whether a candidate for a character string displayed as a result of reading is a result of character recognition or a result of comparison based on a character string obtained as a result of the character recognition. In the present exemplary embodiment, therefore, a result of recognition, which is obtained by recognizing an image on which a character string is written, and a result of comparison, which is obtained by comparing the result of recognition with a database registered in advance, are displayed next to each other.

More specifically, in step S106 illustrated in FIG. 6, the CPU 22 analyzes information from the operation input unit to determine whether the user has checked the character string displayed as the result of reading. If a result of step S106 is positive, a result of recognition and a result of comparison, which is obtained by comparing the result of recognition with the database 25D, are displayed in the same screen next to each other in step S108, and the process proceeds to step S110. If the result of step S106 is negative, the process proceeds to step S110.

In step S110, whether to end the information processing is determined on the basis of information from the operation input unit indicating that the user has requested ending of the information processing or information indicating that all items have been checked and corrected. If a result of step S110 is negative, the process returns to step S104, and if the result of step S110 is positive, the process achieved by the information processing program 25P ends.

Figure 9:
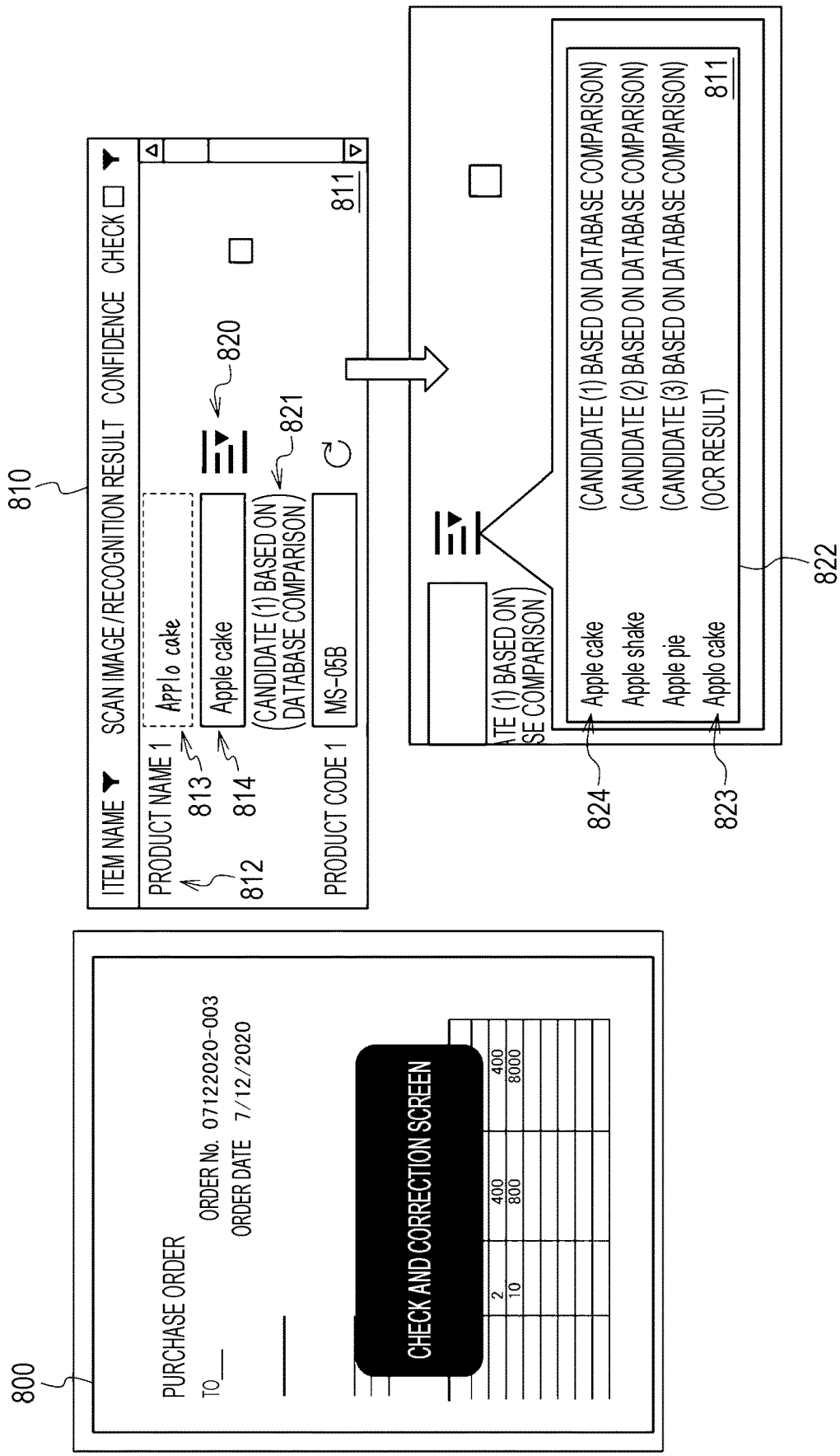
FIG. 9 is a diagram illustrating another example of the check and correction screen.

FIG. 9 is a diagram illustrating an example of an image of a check screen for checking a result of recognition and results of comparison in a check and correction screen according to the present exemplary embodiment. The image of the check screen is displayed when the user requests a check of a character string displayed in the check and correction screen as a result of reading.

In the example illustrated in FIG. 9, information regarding an item "product name 1" is displayed in the display area 811 of the check and correction image 810 as an example of an item name. The check and correction image 810 also includes an icon image 820 for enabling the user to request a check of the result of recognition and the results of comparison in the display area 811, which is provided for each of items determined as reading areas in advance, to the right of the image 814, which indicates the result of recognition. An image 821 indicating attribute information regarding information extracted from the database 25D as the results of comparison is displayed under the image 814, which indicates the result of recognition.

If the user selects (e.g., clicks) the icon image 820, an image 822 of the check screen is displayed while being associated with the icon image 820. In the example illustrated in FIG. 9, the image 822 of the check screen is displayed in a balloon extending from the icon image 820.

The image 822 of the check screen includes an image 823 indicating the result of character recognition and an image 824 indicating the results of comparison between the result of character recognition and the database 25D. In the image 822 of the check screen, the result of character recognition and the results of comparison between the result of character recognition and the database 25D are simultaneously displayed.

In the example illustrated in FIG. 9, the image 823 indicating the result of recognition includes character string information ("applo cake") regarding the result of recognition and attribute information ("OCR result") indicating that the character string information is the result of character recognition. The image 824 indicating the results of comparison includes character string information regarding the results of comparison and attribute information indicating that the character string information is candidates for a character string extracted from the database 25D. One of the results of comparison displayed as the image 814 indicating the result of recognition is a result whose degree of matching exceeds a threshold (a highest degree of matching) among the results of comparison in the image 822 of the check screen. FIG. 9 illustrates an example where results of comparison having highest degrees of matching are displayed in descending order of the degree of matching as candidates for a character string extracted from the database 25D.

Priority levels may be set in advance for candidates for a character string extracted from the database 25D, and the candidates may be arranged in order of the priority level.

Since the result of recognition and the results of comparison are displayed in the same screen, the user can understand how the character recognition (OCR) has been performed and what kinds of candidate have been extracted in the comparison.

As described above, a result of recognition and results of comparison are displayed in the same screen. In the present exemplary embodiment, a result of recognition and results of comparison can be displayed such that the user can understand dependence between the result of recognition and the results of comparison. In addition, one of candidates for a character string, which are the results of comparison, can be selected as a result of comparison to be displayed as the image 814 indicating a result of recognition.

Figure 10:
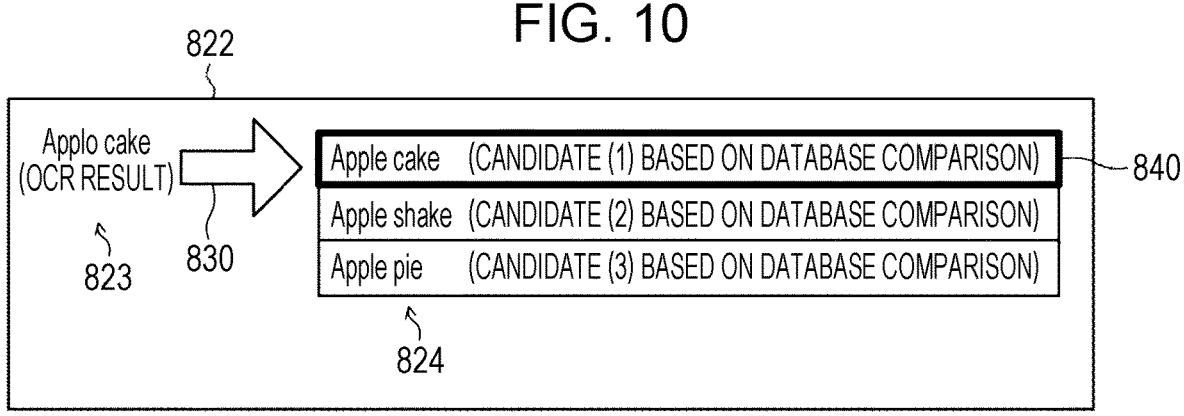
FIG. 10 is a diagram illustrating an example of an image including dependence between a result of recognition and results of comparison.

FIG. 10 is a diagram illustrating an example of an image including dependence between a result of recognition and results of comparison in the check screen.

As illustrated in FIG. 10, the image 822, which is an example of the image of the check screen, includes an arrow image 830 indicating dependence between an image 823 indicating a result of character recognition and an image 824 indicating results of comparison. The image 824 indicating results of comparison is displayed such that the user can select one of the results of comparison, which are candidates for a character string. In the example illustrated in FIG. 10, a selection image 840 indicating that a first candidate (a result of comparison corresponding to character string information "apple cake" and attribute information "candidate (1) based on database comparison") is displayed.

Figure 11:
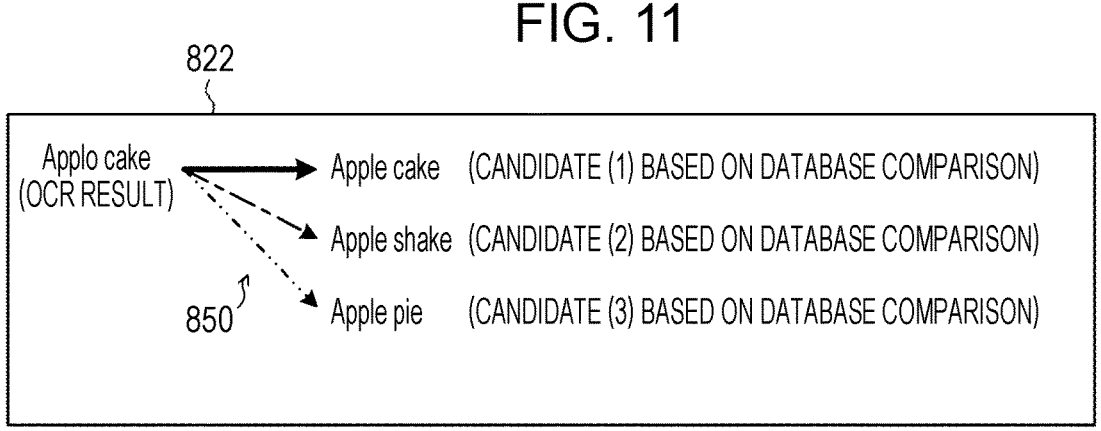
FIG. 11 is a diagram illustrating another example of the image including the dependence between the result of recognition and the results of comparison.

As illustrated in FIG. 11, by using different images 850 indicating different levels of dependence between the result of recognition and the results of comparison, the user can check levels of dependence between the result of recognition and the results of comparison, which are the candidates. FIG. 11 illustrates a case where images 850, which indicate different levels of dependence between the result of recognition and the results of comparison, which are the candidates, of arrows whose line types are different from one another are displayed. In this case, a solid line, a dash-dot line, and a dash-dot-dot line indicate levels of dependence in descending order.

In the above-described process, one or more pieces of information (e.g., character string information) corresponding to information indicating a result of recognition, that is, one or more pieces of information whose degrees of matching exceed a threshold, are extracted from the database 25D. The information registered in the database 25D, however, might include no piece of information whose degree of matching exceeds the threshold. In this case, no piece of information corresponding to the information indicating the result of recognition is extracted from the database 25D. In the present exemplary embodiment, therefore, if no result of comparison whose degree of matching exceeds a first threshold determined as the threshold in advance is extracted, results of comparison whose degrees of matching exceed a second threshold, which is lower than the first threshold, may be extracted. In this case, the display unit 29 may display "not found" information, which indicates that no result of comparison has been obtained for a result of recognition, and the results of comparison whose degrees of matching exceed the second threshold.

Figure 12:
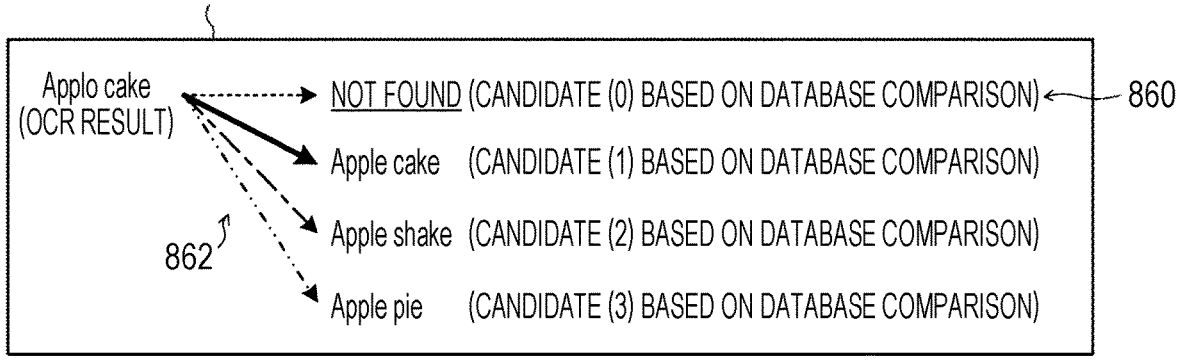
FIG. 12 is a diagram illustrating an example of an image of a check screen at a time when no result of comparison has been extracted.

FIG. 12 is a diagram illustrating an example of an image of a check screen at a time when no result of comparison has been extracted.

As illustrated in FIG. 12, an image 822, which is an example of an image of a check screen at a time when no result of comparison has been extracted, includes an image 860 indicating "not found" information, which indicates that no result of comparison has been obtained for a result of recognition. In the example illustrated in FIG. 12, character string information "not found" and attribute information "candidate (0) based on database comparison", which together form the "not found" information, are displayed. In FIG. 12, an image 862 that includes an image indicating dependence between the result of recognition and the "not found" information and in which arrows whose line types are different from one another are used is displayed.

As described above, according to the present exemplary embodiment, since a result of recognition and results of comparison are displayed in the same screen, the user can understand how character recognition has been performed and what kinds of candidate have been extracted in comparison.

The information processing apparatus 20 according to the present exemplary embodiment is configured to output data in a comma-separated values (CSV) format. In the present exemplary embodiment, therefore, a process for displaying a result of recognition and results of comparison in the same screen is performed, and after the result of recognition is confirmed, settings relating to data conversion at a time when data (e.g., a CSV file) is output to an external system can be made. The data conversion is, for example, CSV conversion.

FIGS. 13 and 14 illustrate examples of setting screens relating to the data conversion. FIG. 13 is a diagram illustrating an example of a setting screen for setting a data format at a time when information including results of recognition is output as a CSV file. FIG. 14 is a diagram illustrating an example of a setting screen relating to one of items (column A in FIG. 14) in the CSV file. As illustrated in FIGS. 13 and 14, by making settings relating to the data conversion, a result of reading (e.g., a result of recognition) and information associated with the result of reading can be output automatically or manually.

An information processing apparatus according to an exemplary embodiment has been described. A program for causing a computer to achieve the functions of the components of the information processing apparatus may be used to implement the exemplary embodiment, instead. A computer readable medium storing the program may be used to implement the exemplary embodiment, instead.

The configuration of the information processing apparatus described in the exemplary embodiment is an example and may be modified depending on a situation insofar as the spirit of the present disclosure is not deviated from.

The processing achieved by the programs in the exemplary embodiment is an example, and some steps deemed unnecessary may be omitted, new steps may be added, or order of steps may be changed, insofar as the scope of the present disclosure is not deviated from.

Although a case where the processing according to the exemplary embodiment is achieved by a software configuration using a computer that executes the programs has been described in the exemplary embodiment, a method for achieving the processing according to the exemplary embodiment is not limited to this. For example, the exemplary embodiment may be achieved by a hardware configuration or a combination of a hardware configuration and a software configuration, instead.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
control a display such that a result of recognition, which is obtained by recognizing an image on which a character string is written, and a result of comparison, which is obtained by comparing the result of recognition with a database registered in advance, are displayed in a same screen; and
control the display such that the result of recognition and the result of comparison are displayed in a mode indicating an association between the result of recognition and the result of comparison,
wherein, in the mode indicating the association, the result of recognition and the result of comparison are displayed using a dependence image, which indicates dependence between the result of recognition and the result of comparison.

2. The information processing apparatus according to claim 1,
wherein the processor is configured to control the display such that a plurality of different results of comparison are displayed as the result of comparison.

3. The information processing apparatus according to claim 2,
wherein the processor is configured to control the display such that the plurality of results of comparison are displayed in a selectable manner and a selected one of the plurality of results of comparison is displayed as a result of comparison associated with the result of recognition.

4. The information processing apparatus according to claim 3,
wherein the processor is configured to display, as the plurality of results of comparison, results of comparison whose degrees of matching with the result of recognition exceed a threshold.

5. The information processing apparatus according to claim 2,
wherein the processor is configured to display, as the plurality of results of comparison, results of comparison whose degrees of matching with the result of recognition exceed a threshold.

6. The information processing apparatus according to claim 5,
wherein the processor is configured to control the display such that the plurality of results of comparison are displayed in descending order of a degree of matching.

7. An information processing apparatus comprising:
a processor configured to:
control a display such that a result of recognition, which is obtained by recognizing an image on which a character string is written, and a result of comparison, which is obtained by comparing the result of recognition with a database registered in advance, are displayed in a same screen; and
control the display such that a plurality of different results of comparison are displayed as the result of comparison.

8. The information processing apparatus according to claim 7,
wherein the processor is configured to control the display such that the plurality of results of comparison are displayed in a selectable manner and a selected one of the plurality of results of comparison is displayed as a result of comparison associated with the result of recognition.

9. The information processing apparatus according to claim 8,
wherein the processor is configured to display, as the plurality of results of comparison, results of comparison whose degrees of matching with the result of recognition exceed a threshold.

10. The information processing apparatus according to claim 7,
wherein the processor is configured to display, as the plurality of results of comparison, results of comparison whose degrees of matching with the result of recognition exceed a threshold.

11. The information processing apparatus according to claim 10,
wherein the processor is configured to control the display such that the plurality of results of comparison are displayed in descending order of a degree of matching.

12. The information processing apparatus according to claim 10,
wherein the processor is configured to control the display such that, if no result of comparison whose degree of matching exceeds a first threshold determined as the threshold in advance is obtained, a plurality of results of comparison whose degrees of matching exceed a second threshold, which is lower than the first threshold, are obtained and "not found" information, which indicates that no result of comparison that matches the result of recognition has been obtained, and the plurality of results of comparison whose degrees of matching exceed the second threshold are displayed.

13. A non-transitory computer readable medium storing a program causing a computer to execute a process for processing information, the process comprising:
controlling a display such that a result of recognition, which is obtained by recognizing an image on which a character string is written, and a result of comparison, which is obtained by comparing the result of recognition with a database registered in advance, are displayed in a same screen; and
controlling the display such that a plurality of different results of comparison are displayed as the result of comparison.

* * * * *